May 2, 1967
K. A. MILETTE
3,316,929
HOUSE TRAILER WASTE OUTLET GATE VALVE
Filed May 7, 1964
2 Sheets-Sheet 1
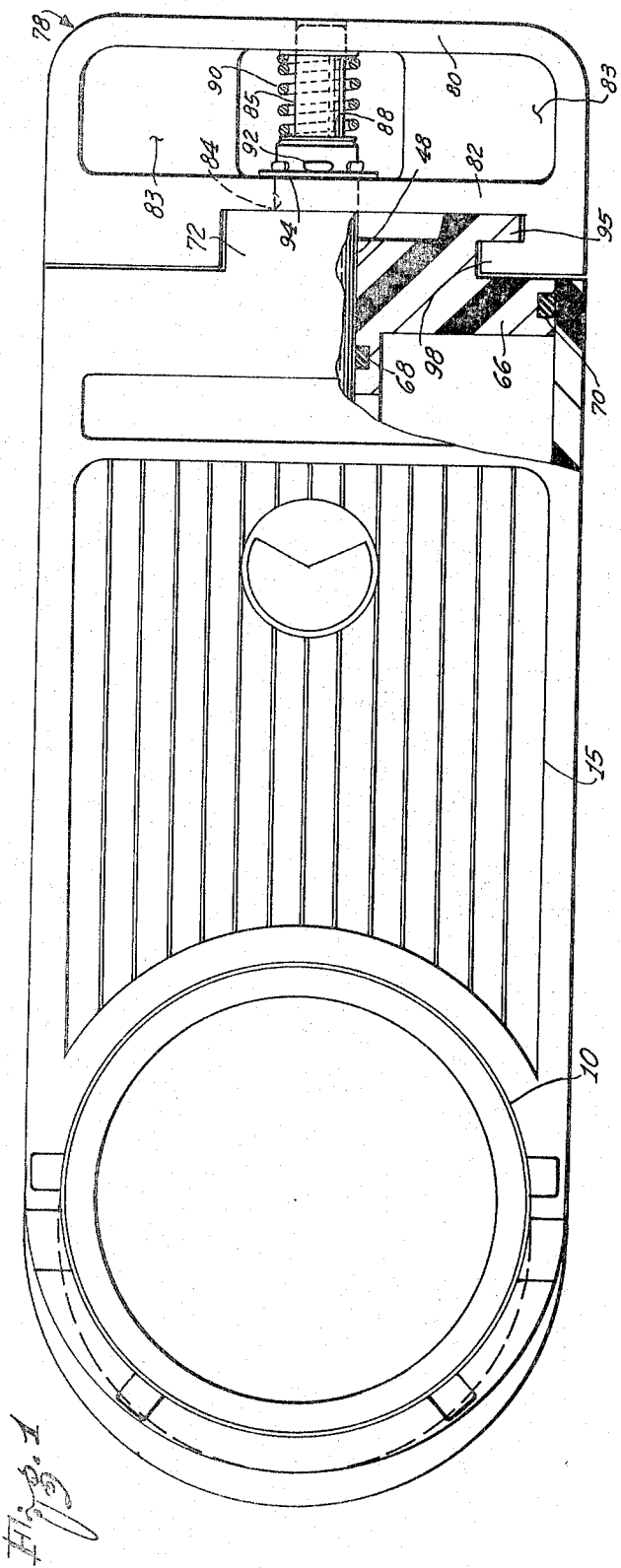
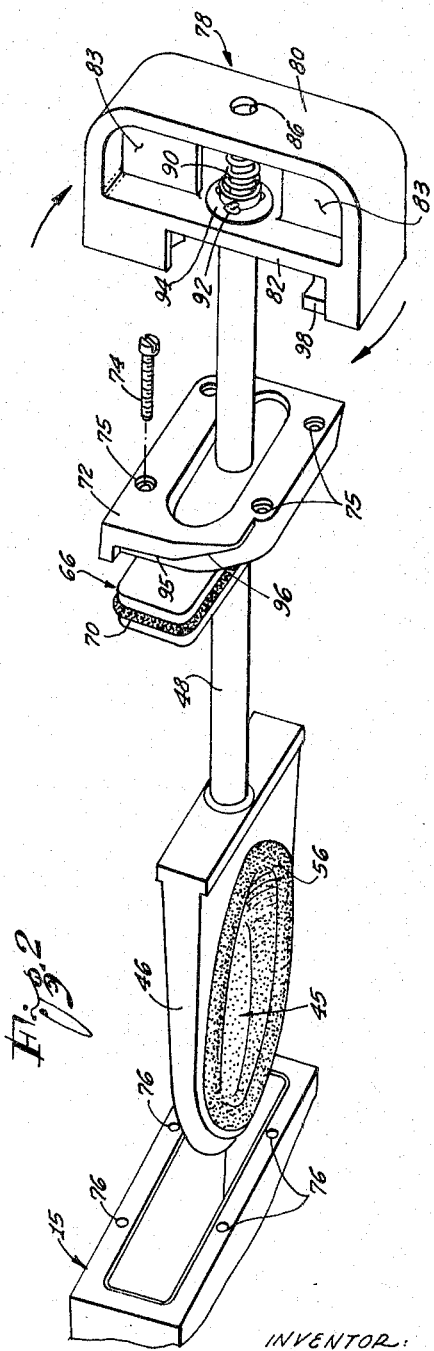
INVENTOR:
Kenneth A. Milette
Attorneys

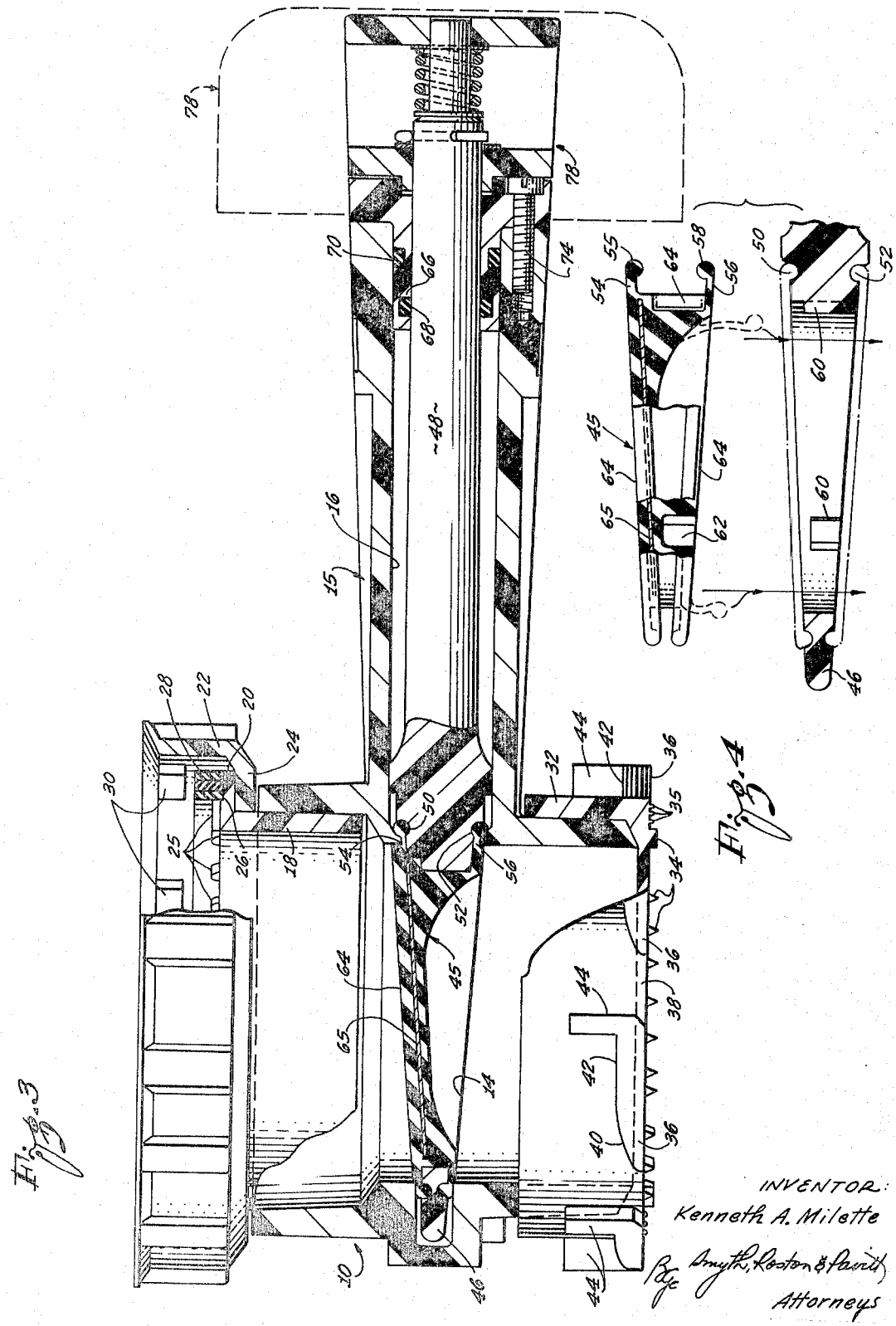

United States Patent Office 3,316,929
Patented May 2, 1967

3,316,929
HOUSE TRAILER WASTE OUTLET GATE VALVE
Kenneth A. Milette, 16103 Lear Court,
Valinda, Calif. 91744
Filed May 7, 1964, Ser. No. 365,641
12 Claims. (Cl. 137—270)

This invention relates to a gate valve and, more particularly, relates to a gate valve for low pressure service.

Although the invention is widely applicable for its purpose, it has special utility as embodied for use on a waste outlet of a vehicle that is used for habitation, such as a house trailer or a camper. Such an embodiment has been selected by way of example for the present disclosure and will serve as adequate guidance for those skilled in the art who may have occasion to apply the same principles for other specific purposes.

The waste outlet in the floor of a vehicle such as a house trailer or the like is closed at times by a suitable gate valve, for example while the vehicle is on the road, but may be opened periodically to dump accumulated waste. The waste outlet is adapted for connection to a sewage system when the vehicle is parked for any period of time where sewage facilities are available. The invention is directed to the problem of providing a number of features that are either requisite or highly desirable in a gate valve for this purpose.

In the first place, such a gate valve should be of relatively light and inexpensive construction. The invention meets this requirement by making the gate valve of molded plastic material.

In the second place, since the gate valve is located under the floor of the vehicle and adequate road clearance is mandatory, the gate valve should be relatively short in axial dimension. The gate valve of the present invention may be designed to fit between two confronting pipe ends that are only 1¼″ apart.

It is also desirable to provide a gate valve which may be readily connected to either a male fitting or a female fitting on a vehicle outlet. To meet this requirement, the gate valve is provided with male and female fittings, respectively, on its two opposite ends, either of which fittings may be used for connection to the vehicle outlet. It so happens, however, that for good reasons the gate valve of the preferred practice of the invention employs an elastomeric valve member that is constructed to withstand upstream pressure against only one of its two faces. A feature of the invention, however, is that the valve member is reversible and may be turned in either direction. Thus if it is desirable to orient the gate valve body in a particular respect for cooperation with a male or female fitting on a vehicle outlet, the valve member inside the valve body may be reversed accordingly if such reversal is necessary.

For sanitary reasons it is requisite that the gate valve be reliably leak proof when it closes the outlet for a road tour or for camping. For this purpose the elastomeric valve member provides two seals spaced apart in series so that leakage cannot occur unless both of the two seals fail. For further reliability in the sealing action, the valve member is tapered to fit into a tapered valve seat under spring pressure. The valve member wedges into the tapered valve seat for highly effective sealing action and automatically adjusts itself to compensate for wear.

A feature of the invention is the concept of the exterior control handle of the gate valve serving a manually operable means to apply the spring pressure when the gate valve is closed. For this purpose the handle is slidingly mounted on the valve stem with the coil spring confined between the handle and the valve stem. When the valve member is seated in closed position, the handle is manually rotatable for engagement with the valve body to place the coil spring under compression with consequent application of the spring force against the valve stem for transmission to the tapered valve member. In the preferred practice of the invention the rotary handle engages the valve body with cam action for advancing the handle against the resistance of the body.

It has been found that a gate valve for use on a waste outlet should open wide in an abrupt manner to keep the valve from being clogged by a mass of waste material. A feature of the invention in this regard is the provision of relatively high static friction to resist opening movement of the valve member. When sufficient manual force is applied to overcome the relatively high static friction, the valve opens fully with a snap action.

It is highly desirable that the gate valve be constructed for servicing or repair simply and rapidly when necessary. A feature of the invention in this regard is that the gate valve is constructed with a replaceable elastomeric valve element and access to the interior of the valve body for replacement of the valve element requires merely the removal of a few screws. No special tool or skill is required and it is a simple matter to carry a spare valve element for emergencies.

The features and advantages of the invention may be understood from the following detailed description and accompanying drawings.

In the drawings, which are to be regarded as merely illustrative:

FIG. 1 is an end elevation of an initial embodiment of the invention with a portion broken away to reveal concealed structure;

FIG. 2 is an exploded perspective view of the valve member and associated parts;

FIG. 3 is a longitudinal view of the embodiment largely in section and partly in side elevation showing the valve member in its closed position; and FIG. 4 is a diagramatic view showing how the elastomeric valve member may be installed in a cooperative holder.

The plastic valve body of the embodiment of the invention illustrated by the drawings has a cylindrical portion 10 forming a flow passage 12 with a tapered valve seat in the form of a groove 14 therein and the valve body is further formed with a hollow lateral extension 15 of rectangular cross section which define what may be termed a guideway 16 that leads to the tapered valve seat. The two opposite ends of the flow passage 12 may be provided with male and female connection fittings respectively which fittings are actually complementary parts of a plastic pipe union.

The female connection fitting shown in FIG. 3 comprises an inner sleeve 18 formed with a radially outward circumferential flange 20 and a cooperating union ring 22 having a radially inward circumferential flange 24 in rotary engagement with the flange 20. The inner sleeve 18 which is bonded to the cylindrical portion 10 of the valve body by suitable cement is formed with a circumferential series of end teeth 25 and is further formed with a circumferential groove 26 to seat a yielding elastomeric sealing ring 28. The union ring 22 is formed with a set of internal circumferentially spaced lugs 30 to engage complementary angular lugs on a cooperative male fitting.

The male fitting at the other end of the flow passage 12 may be in the form of a sleeve 32 that embraces the cylindrical portion 10 of the valve body and overhangs the rim of the cylindrical portion, the sleeve being bonded to the valve body by suitable cement. The outer end of the sleeve 32 is formed with a circumferential set of teeth 34 and three narrow annular ribs 35, the teeth 34 being intended to cooperate with complementary teeth such as he previously mentioned teeth 25 and the ribs 35 being intended to penetrate a sealing ring such as the previously mentioned sealing ring 28 in a sealing manner.

The sleeve 32 is formed with external angular lugs 36 to cooperate with internal lugs such as the previously mentioned internal lugs 30. The external angular lugs 36 are separated by spaces 38 which are dimensioned to pass internal lugs 30. Each of the angular lugs 36 has a circumferentially directed leg which is formed both with a sloping cam shoulder 40 and an adjacent recess 42, the angular lug being further formed with an axial stop finger 44 which serves as a stop adjacent the recess.

It is apparent that with a union ring 22 confronting a sleeve 32 concentrically thereof, the union ring may be telescoped over the sleeve 32 with the internal lugs 30 passing through the spaces 38. The union ring 22 may then be rotated relative to the sleeve 32 to cause the internal lugs 30 to slide over the cam shoulders 40 against the stop fingers 44 to come to rest in the corresponding recesses 42.

The parts are so dimensioned and positioned relative to each other that the movement of the internal lugs 30 over the cam shoulders 40 is resisted by resilient compression of a previously mentioned annular sealing ring 28. The compression of the annular sealing ring 28 is within its elastic limits and when the internal lugs 30 seat in the recesses 42 the annular sealing ring remains under resilient compression to exert sealing pressure between the confronting radial surfaces of the union ring 22 and the sleeve 32 respectively. When the annular sealing ring 28 is compressed in this manner the three circular ribs 35 penetrate the material of the sealing ring with sealing effectiveness. It is apparent that the sealing ring 28 also functions resiliently in the manner of a spring to yieldingly hold the internal lugs 30 in the recesses 42. The teeth 25 cooperate with the teeth 34 to prevent relative rotation between the two sleeves when the union ring 22 is tightened.

A tapered elastomeric valve member 45 for cooperation with the tapered valve seat 14 is removably mounted on a ring-shaped holder 46 which has a radial stem 48 extending to the exterior of the valve body through the hollow lateral extension 15 of the valve body. In the construction shown, the ring-shaped holder 46 is formed with two annular grooves 50 and 52 on its opposite faces, respectively, and the elastomeric valve member 45 has a first circumferential flange 54 formed with a bead 55 to seat in the groove 50 and a second circumferential flange 56 formed with a bead 58 to seat in the second annular groove 52.

The inner circumference of the ring-shaped holder 46 is formed with circumferentially spaced lugs 60, there being three such lugs in this particular embodiment of the invention, and the elastomeric valve member 45 is formed with corresponding peripheral recesses 62 to receive the internal lugs. One face 64 of the elastomeric valve member 45 is intended to withstand the upstream pressure of fluid in the flow passage 12 and for this purpose a metal reinforcement disk 65 is embedded in the body of the valve member, the disk being dimensioned to overhang the internal lugs 60 for support thereby to withstand the upstream pressure.

To install a valve member 45 in the ring-shaped holder 46, the circumferential flange 56 of the valve member is bent back as indicated by dotted lines in FIG. 4 to permit the flange to pass through the ring-shaped holder. Once the circumferential flange 56 is through the ring-shaped holder it is a simple matter to make sure that the two beads 55 and 58 seat in the corresponding annular grooves 50 and 52. It is to be noted that the taper of the valve seat 14 and of the valve member 45 is symmetrical to permit the valve member to be turned to face in either direction in the flow passage 12.

The stem 48 which is an operating rod for controlling the valve member 45 extends through a closure means in the form of a gland 66 that normally closes the outer end of the hollow lateral extension 15 of the valve body and which may be regarded as a movable portion of the valve body. The gland 66 which is of generally rectangular configuration is provided with an internal O-ring 68 which sealingly embraces the stem 48 and is further provided with an external O-ring 70 for sealing engagement with the inner surface of the hollow lateral extension.

As best shown in FIG. 2 the gland 66 is formed with a block portion 72 that overhangs the end of the hollow lateral extension 15 of the valve body and this block portion serves as means for securing the gland. The gland 66 is releasably retained by four screws 74 which extend through four corresponding bores 75 in the block portion 72 and which thread into four corresponding tapped bores 76 in the end of the hollow lateral extension 15.

Rotatably and slidably mounted on the outer end of the valve stem 48 is a suitable handle 78 for manipulating the valve member 45. As best shown in FIG. 2, the handle 78 has an outer transverse web 80 which may be termed the handle web since it serves as the handle proper. The handle 78 is further formed with an inner transverse web 82 that is substantially parallel with the handle web 80, the two webs being interconnected by two short reinforcement webs 83 as shown in FIG. 1.

The valve stem 48 slidingly extends through a bore 84 in the inner web 82 of the handle 78 and a reduced end portion 85 of the valve stem slidingly extends into a smaller bore 86 in the handle web 80. The reduced end portion 85 of the valve stem 48 forms a radial shoulder 88 and a coil spring 90 embracing the reduced end portion acts under compression between the radial shoulder and the handle web 80 to urge the handle 78 towards the outer end of the valve stem. The outward axial movement of the handle 78 is limited by a cotter pin 92 in the valve stem 48 in cooperation with a stop washer 94 that is interposed between the cotter pin and the inner web 82 of the handle. It is apparent that by virtue of this arrangement the handle 78 may be shifted axially inward on the valve stem 48 to place the coil spring 90 under compression and thereby cause the coil spring to urge the valve stem axially inwardly of the valve body to press the tapered valve member 45 into the tapered valve seat 14.

It is contemplated that the handle 78 will be adapted to rotate into and out of engagement with the valve body to releasably hold the spring 90 under pressure for normally holding the elastomeric valve member 45 under pressure. Preferably, but not necessarily, the handle 78 is further adapted to cooperate with the valve body to compress the spring 90 by cam action in response to rotation of the handle relative to the valve body.

In the construction shown in the drawings, opposite sides of the block portion 72 of the gland 66 form two radial shoulders 95 each of which has a tapered leading cam portion 96. For cooperation with the two shoulders 95, the handle 78 is formed with two corresponding radially inwardly directed flanges 98.

With the handle 78 and the gland 66 in the relative rotary positions shown in FIG. 2, the handle may be advanced to straddle the block portion 72 of the gland 66 and then the handle may be rotated relative to the gland to cause the two flanges 98 of the handle to climb th cam portions 96 onto the shoulders 95 of the gland whereby the handle is shifted laterally on the valve stem 48 to place the spring 90 under compression.

The parts are so dimensioned and related that when the handle 78 is in the dotted position shown in FIG. 3 with the handle disengaged from the valve body, the elastomeric valve member 45 is seated in the tapered valve seat 14. If the handle 78 is then rotated into engagement with the valve body to cause the flanges 98 of the handle to climb the cam portions 96 onto the shoulders 95, the handle is thereby retracted to the position shown in solid lines in FIG. 3 with consequent compression of the spring 90 to place the valve member 45 under sealing pressure.

The manner in which the described plastic gate valve serves its purpose may be readily understood from the foregoing description. It is apparent that the union ring 22 may be employed to couple the valve body to a male connector fitting or as an alternative the sleeve 32 at the opposite end of the valve body may cooperate with a union ring of a female connector fitting. Since either end of the flow passage 12 may be the upstream end, it may be necessary to reverse the elastomeric valve member 45 in the valve seat 14 to place the face 64 of the valve member on the upstream side. If such reversal of the elastomeric valve member 45 is required, the four screws 74 are removed to release the gland 66 and the valve assembly shown in FIG. 2 is then withdrawn from the lateral extension 15 of the valve body. The elastomeric valve member 45 is then reversed and returned to the valve seat. This operation of withdrawing the valve member 45 for servicing or replacement is a simple operation and the only tool required is a screwdriver.

With the gate valve closed as shown in FIG. 3 it may be opened by simply rotating the handle 78 out of engagement with the valve body and then pulling on the handle to shift the valve member 45 out of the valve seat 14 into a retracted position inside the guideway 16. When the handle is disengaged and manual force is applied to the handle for the purpose of withdrawing the valve stem 48 the static friction created largely by the internal O-ring 68 resists axial movement of the valve stem and as the manual force is increased to overcome the resistance, the static friction is overcome abruptly with the consequence that the elastomeric valve member 45 is drawn abruptly to its retracted open position with a snap action. The abrupt opening of the valve to full extent tends to prevent clogging of the valve by waste matter.

To close the valve, the handle 78 is employed to push the valve stem 48 inward to cause the elastomeric valve member 45 to shift from the guideway 16 into the tapered valve seat 14. The parts are then positioned with the handle 78 in the position indicated by dotted lines in FIG. 3. The handle is then rotated into engagement of the two flanges 98 with the cam portions with consequent compression of the spring 90 to place the valve member under compression.

My description in specific detail of the selected embodiment of the invention will suggest various changes, substitutions and other departures from my disclosure within the spirit and scope of the appended claims.

I claim:

1. In a gate valve having a body with a flow passage therethrough with a transverse tapered valve seat in the flow passage, the gate valve further having a tapered valve member with a stem protruding from the body for manipulation to move the valve member into and out of wedging sealing engagement with the valve seat, the improvement comprising:
   a handle mounted on the outer end of the stem for manual control of the valve member, the handle being movable longitudinally of the stem;
   cooperative stop means on the stem and on the handle respectively to limit the outward movement of the handle relative to the stem;
   spring means acting between the handle and the stem to urge the handle towards its outer limit position as determined by the stop means; and
   means on the handle to engage the body at the closed position of the valve member, said engaging means being operable to force the handle towards the valve body against the resistance of the spring means thereby to create spring force to maintain the valve member under pressure in the valve seat.

2. The improvement set forth in claim 1 in which:
   one of said handle and said body has at least one spirally inclined surface;
   the other of said handle and said body has a portion to engage the spirally inclined surface; and
   the handle is rotatable relative to the body to cause said portion to slide along said surface to cam the handle towards the body in opposition to the force of the spring means.

3. In a gate valve having a body with a flow passage therethrough with a transverse tapered valve seat in the flow passage and having a tapered valve member with a stem protruding from the body for manipulation to move the valve member into and out of wedging sealing engagement with the valve seat, the improvement comprising:
   a handle mounted on the outer end of the stem for manual control of the valve member, the handle being movable longitudinally of the stem and being rotatable relative to the valve member;
   stop means to limit the outward movement of the handle relative to the valve member;
   spring means effective between the handle and the valve member to urge the handle towards its outer limit position as determined by the stop means; and
   cooperative means on the handle and the valve body respectively operable by rotation of the handle to hold the handle releasably in a position to stress the spring means to create spring force to maintain the valve member under pressure in the valve seat.

4. In a gate valve having a body with a flow passage therethrough with a transverse tapered valve seat in the flow passage and having a tapered valve member with a stem protruding from the body for manipulation to move the valve member into and out of wedging sealing engagement with the valve seat, the improvement comprising:
   a handle mounted on the outer end of the stem for manual control of the valve member, the handle being movable longitudinally of the stem;
   spring means interposed between the handle and the stem; and
   cooperative means on the handle and the body, respectively, to move the handle towards the body by cam action in response to rotation to the handle relative to the body to place the spring means under stress to maintain the valve member under pressure.

5. The improvement set forth in claim 4 in which said cooperative means comprises two diametrically opposite cam elements on one of the handle and the body for engagement by two diametrically opposite portions of the other of the handle and body.

6. In a gate valve having a body with a flow passage therethrough, a transverse tapered valve seat in the flow passage, a tapered valve member to wedge into the seat to seal the flow passage, a guideway extending laterally of the flow passage to guide the valve member between a closed position in the seat and an open position in the guideway from the seat, closure means normally closing the outer end of the guideway, the closure means being removable to permit withdrawal of the valve member from the body, control means slidably extending through the closure means, and a handle on the outer end of the control means, the improvement comprising:
   said handle being rotatable relative to the valve member and also being movable towards and away from the valve member;
   stop means to limit the movement of the handle away from the valve member;
   spring means acting between the handle and the control means to urge the handle in the direction away from the valve member against the stop means; and
   cooperative means on the handle and closure means respectively to move the handle towards the valve member in response to rotation of the handle relative to the closure means thereby to stress the spring means to create spring pressure to seat the valve member.

7. The improvement set forth in claim 6 in which said cooperative means comprises cam elements on one of the handle and the closure means cooperative with corresponding surfaces on the other of the handle and the closure means.

8. In a gate valve having a body with a flow passage therethrough with a transverse tapered valve seat in the flow passage and having a tapered valve member with a stem protruding from the body for manipulation to move the valve member into and out of wedging sealing engagement with the valve seat, the improvement comprising:

the stem being formed with a tapered ring on its inner end;

the valve member being a tapered elastomeric disk yieldingly mounted in said ring; and the ring being formed with at least one shoulder surface in abutment with the downstream side of the elastomeric disk to prevent dislodgement of the disk by upstream pressure in the flow passage.

9. The improvement set forth in claim 8 in which the elastomeric disk has a rigid reinforcement incorporated therein and the ring is formed with shoulder means on the downstream side of the elastomeric disk abutting the margin of the elastomeric disk and overlapping the area of the rigid reinforcement.

10. The improvement set forth in claim 8 in which the ring is formed with two circular grooves on its opposite sides, respectively, and in which said elastomeric disk has two circumferential flanges formed with sealing beads to seat into the two grooves respectively.

11. In a gate valve having a body with a flow passage therethrough with a transverse tapered valve seat in the flow passage and having a tapered valve member with a stem protruding from the body for manipulation to move the valve member into and out of wedging sealing engagement with the valve seat, the improvement comprising:

the gate valve body being equipped with male and female fittings respectively at the opposite ends of the flow passage whereby the gate valve can be connected to fluid sources having either male fittings or female fittings;

the taper of the valve seat being symmetrical;

the valve member being an elastomeric member reinforced to withstand upstream pressure directed against a particular one of its two faces; and the valve member being reversible in the valve seat for positioning to withstand upstream pressure from either end of the flow passage.

12. A gate valve having in combination:

a hard plastic body with a flow passage therethrough, the valve body forming a tapered valve seat in the flow passage and a transverse guideway aligned with the valve seat, the opposite ends of the flow passage being adapted respectively for connection to a female fitting and a male fitting; respectively;

a tapered elastomeric valve member movable between a closed position in the valve seat and a retracted open position in the guideway;

a control member extending from the valve member through the guideway to the exterior of the body;

a handle mounted on the outer end of the control member for movement thereon between a normal position and a retracted position; and spring means compressible by the handle at its normal position to maintain the valve member under pressure, said valve member being reversible in the valve seat to turn the upstream side of the valve member towards either end of the flow passage.

References Cited by the Examiner
UNITED STATES PATENTS

| | | | |
|---|---|---|---|
| 631,699 | 8/1899 | Darragh | 137—269 |
| 1,708,060 | 4/1929 | Harrison | 137—269 |
| 1,752,456 | 4/1930 | Pillott | 251—176 |
| 2,273,605 | 2/1942 | Wall | 251—176 |
| 2,639,117 | 5/1953 | Hogard | 251—326 X |
| 2,665,879 | 1/1954 | Housekeeper | 251—315 X |
| 2,884,222 | 4/1959 | Oakes | 251—327 X |
| 3,185,437 | 5/1965 | Rice | 251—329 X |

CLARENCE R. GORDON, *Primary Examiner.*